United States Patent Office 3,429,871
Patented Feb. 25, 1969

3,429,871
THIAZOLYL MONOAZO DYES FOR HYDROPHOBIC TEXTILE FIBERS
Max A. Weaver and David J. Wallace, Kingsport, Tenn., assignors to Eastman Kodak Company, Rochester, N.Y., a corporation of New Jersey
No Drawing. Filed Sept. 27, 1965, Ser. No. 490,652
U.S. Cl. 260—158         8 Claims
Int. Cl. C09b 39/00

ABSTRACT OF THE DISCLOSURE

Thiazolyl-azo-aniline compounds containing substituted dicarboximido and glutarimido groups bonded to the aniline nitrogen atom through an alkylene bridge are useful as dyes for hydrophobic textile materials.

---

This invention relates to azo compounds especially useful as dyes for textile fibers, yarns and fabrics.

The azo compounds have the general formula

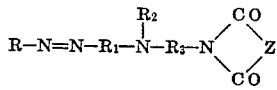

wherein R represents a monocyclic 2-thiazolyl radical, that is, a radical having the general formula

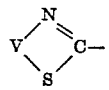

in which V is a vinylene group, including unsubstituted vinylene and mono- and di-substituted vinylene groups, such as

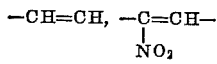

and

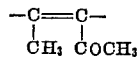

as present in 2-aminothiazole and the substituted 2-aminothiazoles described in the examples and table below. The lower alkyl, trihaloalkyl, lower alkylsulfonyl, nitro, cyano, thiocyano and phenyl substituted 2-aminothiazoles are particularly useful in the preparation of the azo compounds;

$R_1$ represents a monocyclic carbocyclic aromatic group of the benzene series derived from an aminoalkylaniline coupling component and including p-phenylene and p-phenylene substituted with lower alkyl, e.g. o,m-methyl-p-phenylene; lower alkoxy, e.g. o,m-methoxy-p-phenylene; halogen, e.g. o,m-chloro-p-phenylene; lower alkanoylamino, e.g. o,m-acetamido-p-phenylene; lower alkylsulfonamido, e.g. o,m-methylsulfonamido-p-phenylene; lower alkylthio, e.g. o,m,-methylthio-p-phenylene; or benzamido, e.g. benzamido-p-phenylene.

$R_2$ represents hydrogen or an alkyl radical including unsubstituted alkyl, preferably lower alkyl, i.e., from 1 to 4 carbon atoms, and substituted alkyl such as hydroxyalkyl, e.g. hydroxyethyl; polyhydroxyalkyl, e.g. 2,3-dihydroxypropyl; lower alkoxyalkyl, e.g. methoxyethyl; cyanoalkyl, e.g. cyanoethyl; lower cyanoalkoxyalkyl, e.g. β-cyanoethoxyethyl; lower alkanoyloxyalkyl, e.g. acetoxyethyl; lower carbalkoxyalkyl, e.g. carbethoxyethyl; halogenoalkyl, e.g. chloroethyl; hydroxyhalogenoalkyl, e.g. β-hydroxy-γ-chloropropyl; alkylsulfonylalkyl, e.g. methylsulfonylethyl; lower alkyl-OCOOCH₂CH₂—, e.g. CH₃OCOOCH₂CH₂; carbamoylalkyl, e.g. carbamoylethyl; lower alkylcarbamoylalkyl, e.g. ethylcarbamoylethyl; phenoxyalkyl, e.g. β-phenoxyethyl; lower alkylsulfonamidoalkyl, e.g. methylsulfonamidoethyl; dicarboxamidoalkyl, e.g. β-dicarboxamidoethyl, etc. or $R_2$ represents cycloalkyl, benzyl, or a monocyclic carbocyclic aromatic radical of the benzene series, e.g. unsubstituted phenyl and substituted phenyl such as lower alkylphenyl, lower alkoxyphenyl, or halophenyl, etc. A preferred group represented by $R_2$ includes hydrogen, alkyl, alkoxyalkyl, phenoxyalkyl, alkanoyloxyalkyl, haloalkyl, hydroxyalkyl, carbethoxyalkyl or cyanoalkyl, the alkyl groups of which are lower alkyl, $R_3$ represents lower alkylene, lower hydroxyalkylene, lower alkanoyloxyalkylene or lower chloroalkylene, Z represents one of the groups

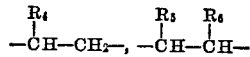

or

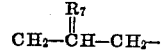

in which $R_4$ represents a phenylcarbamoyloxy group, e.g.

lower alkylcarbamoyloxy, e.g.

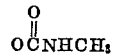

halogen, e.g. chlorine or bromine, mercapto, lower alkylthio, e.g. $SCH_3$, $SC_2H_5$, lower alkanoyl, e.g. $COCH_3$, $COC_2H_5$, lower alkanoyloxy, e.g.

amino, lower alkanoylamino, e.g. $NHCOCH_3$

or carbamoyl; both $R_5$ and $R_6$ represent hydroxyl, halogen or lower alkanoyloxy, e.g. as present in the chains:

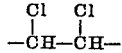

and

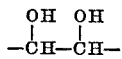

and

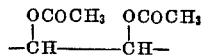

or $R_5$ represents halogen when $R_6$ is hydroxy or lower alkanoyloxy as present in the chains:

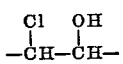

and

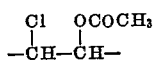

$R_7$ represents halogen, hydroxyl, lower alkoxy or lower alkanoyloxy.

Herein, alkyl, alkylene, lower alkyl and lower alkylene mean the akyl chain, straight or branched-chained, contains 1 to 4 carbon atoms.

As can be seen from the examples below, the various substituents attached to groups R, $R_1$, and $R_2$ serve primarily as auxochrome groups to control the color of the azo compound. In general, azo compounds very useful as textile dyes are obtained by wide variation of the substituents.

The azo compounds are prepared by coupling the diazonium salts of 2-aminothiazoles, well known in the art, with substituted aniline coupling components having the formula II 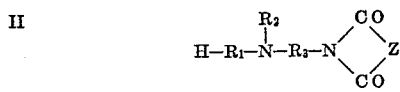

wherein $R_1$, $R_2$, $R_3$ and Z have the above meaning.

The coupling components of Formula II containing the dicarboximido radical are prepared by one of several known methods illustrated in the examples:

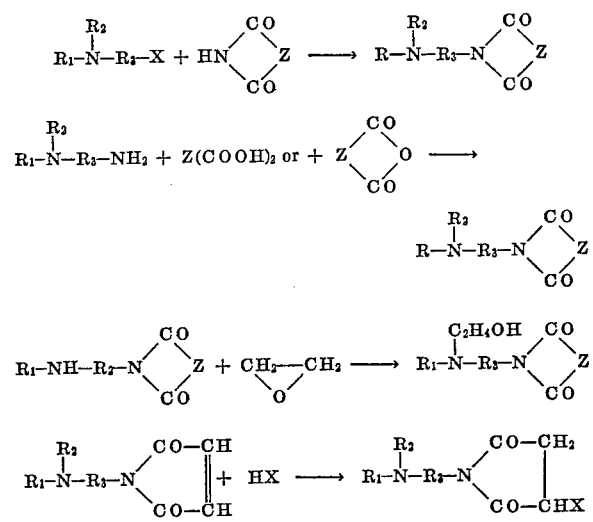

X represents halogen; $R_1$, $R_2$ and $R_3$ are as defined above.

The azo compounds can be used for dyeing textile materials including synthetic polymer fibers, yarns and fabrics giving a variety of fast shades including red, blue and violet shades when applied by conventional dyeing methods. The azo compounds are useful, for example, for dyeing polyester, polyamide and cellulose acetate fibers and when used for dyeing such hydrophobic fibers should be free of water-solubilizing groups such as carboxyl and sulfo. In general, the azo compounds have good fastness, for example, to light, washing, gas (atmospheric fumes) and sublimation. The azo compounds can also be expected to respond favorably to other textile dye tests such as described in the A.A.T.C.C. Technical Manual, 1964 edition, depending in part upon the particular dye used and fiber being dyed.

The azo compounds of Formula I above are similar in structure to the azo compounds of U.S. 3,148,180 also containing a dicarboximido radical. However, in the compounds of the present invention, in the radical

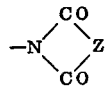

Z does not include the group $—CH_2—CH_2—$ of the compounds of U.S. 3,148,180, but includes only groups

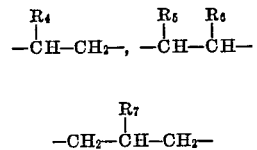

or

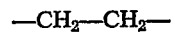

in which the $R_4$–$R_7$ substituents are defined above. The azo compounds of our invention containing these $R_4$–$R_7$ substituents possess unique properties compared to the compounds in which Z represents the group $$—CH_2—CH_2—$$

Our azo compounds possess substantially better fastness, e.g. to sublimation and light and possess better affinity for textile fibers, depending in part upon the substituent $R_4$–$R_7$ in used and the particular fiber being dyed.

The azo compounds of the invention may be used for dyeing hydrophobic fibers such as linear polyester, cellulose ester, acrylic, polyamide, etc., fibers in the manner described in U.S. Patents 2,880,050, 2,757,064, 2,782,187 and 2,043,827. The following examples illustrate methods by which the azo compounds of the invention can be used to dye polyester textile materials.

0.1 gram of the dye is dissolved in the dye pot by warming in 5 cc. of ethylene glycol monomethyl ether. A 2% sodium-N-methyl-N-oleyl taurate and 0.5% sodium lignin sulfonate aqueous solution is added, with stirring, until a fine emulsion is obtained. Water is then slowly added to a total volume of 200 cc. 3 cc. of Dacronyx (a chlorinated benzene emulsion) are added and 10 grams of a textile fabric made of Kodel polyester fibers are entered. The fabric is worked 10 minutes without heat and then for 10 minutes at 80° C. The dyebath is then brought to the boil and held at the boil for one hour. Following this, the fabric is rinsed in warm water, then scoured in an aqueous 0.2% soap, 0.2% soda ash solution. After scouring, the fabric is rinsed with water and dried. Accordingly, since the azo compounds of the invention are water-insoluble, they can be applied from aqueous dispersions in the manner of the so-called "dispersed dyes." However, coloration can also be effected, for example, by incorporating the azo compounds into the spinning dope and spinning the fiber as usual. The azo compounds of our invention have varying utility as dyes. The degree of utility varies, for example, depending upon the material being dyed and the formula of the azo compound. Thus, for example, all the dyes will not have the same degree of utility for the same material.

By cellulose aliphatic carboxylic acid esters having 2 to 4 carbon atoms in the acid groups thereof, we mean to include, for example, both partially hydrolyzed and unhydrolyzed cellulose acetate, cellulose propionate and cellulose acetatebutyrate.

Polymeric linear polyester materials of the terephthalate type are illustrative of the linear aromatic polyester textile materials that can be dyed with the new azo compounds of our invention. The terephthalate fibers sold under the trademarks "Kodel," "Dacron" and "Terylene," for example, in the form of filaments, yarn and fabric, for example, are illustrative of the polyester textile materials that can be dyed. Kodel polyester fibers are more particularly described in U.S. Patent 2,901,446. Dacron and Terylene polyester fibers are described, for example, in U.S. Patent 2,465,319. The polymeric linear polyester materials disclosed in U.S. Patents 2,945,010, 2,957,745 and 2,989,363, for example, can be dyed. The linear aromatic polyester materials specifically named have a melting point of at least 200° C.

Nylon, in fiber, yarn and fabric form is representative of polyamides which can be dyed with the azo compounds.

The following examples will serve to illustrate our invention.

EXAMPLE 1

A. Preparation of the coupler: 17.8 g. N-(2-aminoethyl)-N-ethyl-m-toluidine and 13.4 g. malic acid were heated together at 145–150° C. for one hour. The reaction mixture was poured into water and collected by filtration. After recrystallization from 75 ml. of ethanol, the material melted at 98–99° C. The product was obtained in 58% yield and had the following structure:

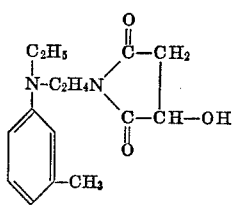

B. Preparation of the dye—Diazotization: 2.9 g. 2-amino-5-nitrothiazole was stirred in 60 cc. water and 32 cc. concentrated $H_2SO_4$ was added. Immediate solution resulted. The solution was cooled to −10° C. and a solution of 1.4 g. $NaNO_2$ in 10 ml. concentrated $H_2SO_4$ was added at −10 to −5° C. Stirring at −5° C. was continued for 10 minutes.

Coupling.—5.52 g. N-[2-(N-ethyl-m-toluidino)ethyl]-malimide from (A) was dissolved in 100 ml. of 15% aqueous sulfuric acid. The coupling solution was cooled in an ice bath and the diazonium solution from above was added. After coupling one hour, the mixture was drowned in water, filtered, washed with water and air dried. The product dyes cellulose acetate and polyester fibers a brilliant fast blue-violet shade and has the following structure:

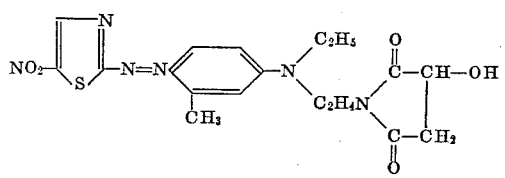

EXAMPLE 2

One gram of the above dye was heated in 5 cc. of acetic acid and 5 cc. of acetic anhydride on a steam bath for one hour. The reaction mixture was drowned into water, filtered and air dried. The product, which had the following structure, dyed cellulose acetate and polyester fibers a deep fast blue-violet sade.

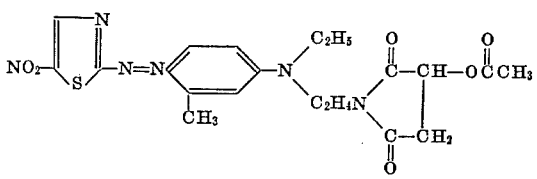

EXAMPLE 3

A. Preparation of the coupler: 13.8 g. N-[2-(N-ethyl-m-toluidino)ethyl]malimide, 6.0 g. phenyl isocyanate, 3 drops triethylamine and 100 ml. benzene were refluxed together for 2½ hours. The benzene was evaporated off to yield an oily product, which crystallized on standing. The M.P. after two recrystallizations from ethanol was 103–105° C. This coupler had the following structure:

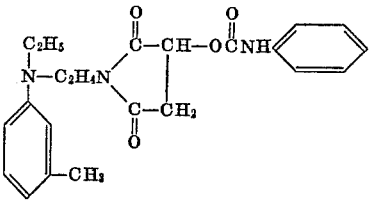

B. 2-amino-5-nitrothiazole was diazotized and coupled with the above coupler as in Example 1(B) to yield the following dye:

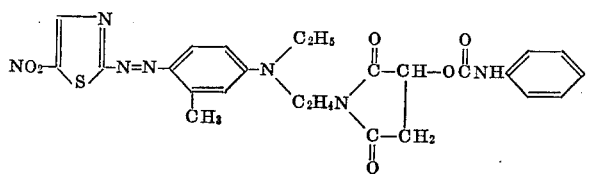

This dye, which dyes cellulose acetate and polyester fibers deep blue-violet shades, has excellent light and sublimation fastness.

EXAMPLE 4

A. Preparation of the coupler: 30.0 g. N-2-aminoethyl-m-toluidine and 26.8 g. malic acid were heated together at 150–160° C. for one hour and then at 180° C. for 30 minutes. The reaction mixture was allowed to cool and 20 ml. epichlorohydrin plus 200 ml. ethanol were added. After refluxing 20 hours, the alcohol was evaporated off to yield 69 g. of product which failed to crystallize on standing. The product had the following structure:

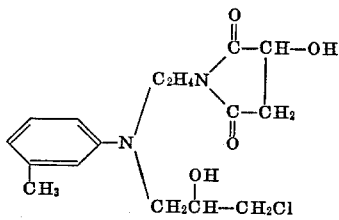

B. 2.9 g. 2-amino-5-nitrothiazole was diazotized and coupled with 6.82 g. of the above coupler (4A), exactly as in (1B) to give the following dye:

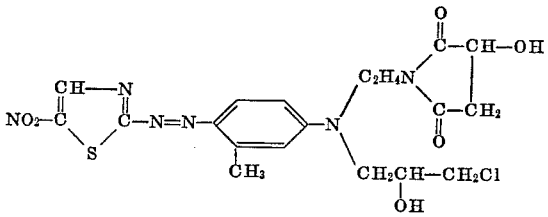

This blue-violet dye has excellent light and sublimation fastness.

The azo compounds of the examples of the following table having the formula

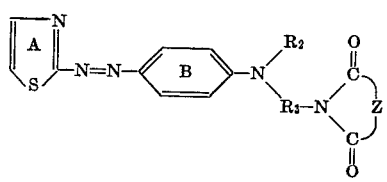

are prepared in the manner described in the above examples by coupling the 2-aminothiazole and coupler indicated in the table. The color is that obtained on polyester fibers.

TABLE

| Example | Substituents on Ring A | Substituents on Ring B | $R_2$ | $R_3$ | Z | Color |
|---|---|---|---|---|---|---|
| 5 | 5-NO$_2$ | None | —C$_2$H$_5$ | —CH$_2$CH$_2$— | —CH$_2$—CH(OH)— | Violet. |
| 6 | 5-NO$_2$ | None | —CH$_2$CH(OH)CH$_2$Cl | —CH$_2$CH$_2$— | —CH$_2$—CH(Cl)— | Do. |
| 7 | 5-NO$_2$ | None | —CH$_2$CH(OH)CH$_2$Cl | —CH$_2$CH$_2$— | —CH$_2$—CH(SH)— | Do. |
| 8 | 5-NO$_2$ | None | —C$_2$H$_5$ | —CH$_2$CH$_2$— | —CH$_2$—CH(O=C—CH$_3$)— | Do. |
| 9 | 5-NO$_2$ | 3-CH$_3$ | —C$_2$H$_5$ | —CH$_2$CH$_2$— | —CH$_2$—CH(Cl)— | Blue. |
| 10 | 5-NO$_2$ | 3-CH$_3$ | —C$_2$H$_5$ | —CH$_2$CH$_2$— | —CH(Cl)—CH(Cl)— | Do. |
| 11 | 5-NO$_2$ | 3-CH$_3$ | —C$_2$H$_5$ | —CH$_2$CH$_2$— | —CH$_2$—CH(NH$_2$)— | Do. |
| 12 | 5-NO$_2$ | 3-CH$_3$ | —C$_2$H$_5$ | —CH$_2$CH$_2$— | —CH$_2$—CH(NHCOCH$_3$)— | Do. |
| 13 | 5-NO$_2$ | 3-CH$_3$ | —C$_2$H$_5$ | —CH$_2$CH$_2$— | —CH$_2$—CH(CONH$_2$)— | Do. |
| 14 | 5-NO$_2$ | 3-CH$_3$ | —C$_2$H$_5$ | —CH$_2$CH$_2$— | —CH$_2$—CH(CN)— | Do. |
| 15 | 5-NO$_2$ | 3-Cl | —C$_2$H$_5$ | —CH$_2$CH$_2$— | —CH$_2$—CH(OH)— | Violet. |
| 16 | 5-NO$_2$ | 3-Cl | —CH$_3$ | —CH$_2$CH$_2$— | —CH$_2$—CH(SO$_2$CH$_3$)— | Do. |
| 17 | 5-NO$_2$ | 3-Cl | —C$_2$H$_4$CN | —CH$_2$—CH(OH)CH$_2$— | —CH$_2$CH(OH)— | Do. |
| 18 | 5-NO$_2$ | 3-OCH$_3$ | —C$_2$H$_4$CN | —CH$_2$CH$_2$— | —CH$_2$CH(OH)— | Blue. |
| 19 | 5-NO$_2$ | 3-OCH$_3$ | —C$_2$H$_5$ | —CH$_2$— | —CH$_2$CH(OH)— | Do. |
| 20 | 5-NO$_2$ | 3-NHCOCH$_3$ | —C$_2$H$_5$ | —CH$_2$CH$_2$— | —CH$_2$CH(Cl)— | Do. |
| 21 | 5-NO$_2$ | 3-NHCOCH$_3$ | —C$_4$H$_9$—N | —CH$_2$CH$_2$— | —CH$_2$CH(Cl)— | Do. |
| 22 | 5-NO$_2$ | 3-NHCOCH$_3$ | Cyclohexyl | —CH$_2$CH$_2$— | —CH$_2$CH(SCH$_3$)— | Do. |
| 23 | 5-NO$_2$ | 3-NHCOCH$_3$ | —C$_2$H$_5$ | —CH$_2$CH(Cl)CH$_2$— | —CH$_2$CH(OH)— | Do. |
| 24 | 5-NO$_2$ | 2,5-di-OCH$_3$ | —C$_2$H$_5$ | —CH$_2$CH$_2$— | —CH$_2$CH(OH)— | Do. |
| 25 | 5-NO$_2$ | 2-Cl | H | —CH$_2$CH$_2$— | —CH$_2$CH(OH)— | Red. |
| 26 | 5-NO$_2$ | 3-CH$_3$ | —C$_2$H$_4$OH | —CH$_2$CH$_2$— | —CH$_2$CH(OH)— | Blue. |
| 27 | 5-NO$_2$ | 3-CH$_3$ | —C$_2$H$_4$Cl | —CH$_2$CH$_2$— | —CH$_2$CH(OH)— | Do. |
| 28 | 5-NO$_2$ | 3-CH$_3$ | —C$_2$H$_4$OC(O)CH$_3$ | —CH$_2$CH$_2$— | —CH$_2$CH(OCOCH$_3$)— | Do. |
| 29 | 4-CF$_3$ | 3-CH$_3$ | —C$_2$H$_4$OCH$_3$ | —CH$_2$CH$_2$— | —CH$_2$CH(OCOCH$_3$)— | Red. |
| 30 | 4-CF$_3$ | 3-CH$_3$ | —C$_2$H$_4$SO$_2$CH$_3$ | —CH$_2$CH$_2$— | —CH$_2$CH(OCOCH$_3$)— | Do. |

TABLE—Continued

| Example | Substituents on Ring A | Substituents on Ring B | $R_2$ | $R_3$ | Z | Color |
|---|---|---|---|---|---|---|
| 31 | 4-CO$_2$C$_2$H$_5$ | 3-CH$_3$ | —C$_2$H$_4$CN | —CH$_2$CH$_2$— | —CH$_2$CH(Cl)— | Red. |
| 32 | 4-NHCOCH$_3$ | 3-CH$_3$ | —C$_2$H$_4$CN | —CH$_2$CH$_2$— | —CH$_2$CH(Cl)— | Do. |
| 33 | 4-C$_6$H$_5$ | 3-CH$_3$ | —CH$_2$CH(OH)—CH$_2$Cl | —CH$_2$CH$_2$— | —CH$_2$CH(N(C$_2$H$_5$)$_2$)— | Do. |
| 34 | 5-Cl | 3-CH$_3$ | —CH$_2$CH(OH)—CH$_2$Cl | —CH$_2$CH$_2$— | —CH$_2$CH(SH)— | Do. |
| 35 | 5-SO$_2$C$_4$H$_9$ | 3-CH$_3$ | —CH$_2$CH(OH)—CH$_2$Cl | —CH$_2$CH$_2$— | —CH$_2$CH(OH)— | Violet. |
| 36 | 4-CH$_3$, 5-COCH$_3$ | 3-CH$_3$ | 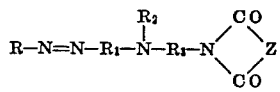 | —CH$_2$CH$_2$— | —CH$_2$CH(OH)— | Do. |
| 37 | 5-NO$_2$ | 3-CH$_3$ | —C$_2$H$_5$ | —CH$_2$CH(OCOCH$_3$)—CH$_2$— | —CH$_2$CH(OCOCH$_3$) | Do. |

What we claim is:

1. A water-insoluble azo compound having the formula

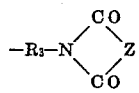

wherein
R = a monocyclic 2-thiazolyl group;
R$_1$ = p-phenylene or p-phenylene substituted with lower alkyl, lower alkoxy, chlorine, bromine, lower alkanoylamino, lower alkylsulfonamido, lower alylthio, or benzamido;
R$_2$ = hydrogen; lower alkyl; lower alkyl substituted with hydroxy, lower alkoxy, cyano, lower alkanoyloxy, lower carbalkoxy, chlorine, bromine, lower alkylsulfonyl, lower alkyl-OCOO—, carbamoyl, lower alkylcarbamoyl, phenoxy, or lower alkylsulfonamido; benzyl; cyclohexyl; phenyl; phenyl substituted with lower alkyl, lower alkoxy, chlorine, or bromine;

or
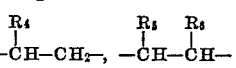

R$_3$ = lower alkylene; lower hydroxyalkylene, lower alkanoyloxyalkylene, or chloroalkylene; and
Z = one of the groups

in which R$_4$ represents phenylcarbamoyloxy, lower alkylcarbamoyloxy, chlorine, bromine, mercapto, lower alkylthio, lower alkanoyl, lower alkanoyloxy, hydroxyl, amino, lower alkanoylamino, or carbamoyl; both R$_5$ and R$_6$ represent hydroxyl, halogen or lower alkanoyloxy; or R$_5$ represents chlorine or bromine when R$_6$ is hydroxyl or lower alkanoyloxy; and R$_7$ represents chlorine, bromine, hydroxyl, lower alkoxy, or lower alkanoyloxy.

2. A water-insoluble azo compound having the formula

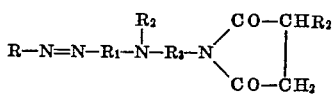

wherein
R = 2-thiazolyl substituted with lower alkyl, trifluoromethyl, lower alkylsulfonyl, nitro, cyano, thiocyano, or phenyl;
R$_1$ = p-phenylene or p-phenylene substituted with lower alkyl, lower alkoxy, chlorine, bromine, lower alkanoylamino, lower alkylsulfonamido, lower alkylthio, or benzamido;
R$_2$ = lower alkyl or lower alkyl substituted with lower alkoxy, phenoxy, lower alkanoyloxy, chlorine, bromine, hydroxy, lower carbalkoxy, or cyano;
R$_3$ = lower alkylene, lower hydroxyalkylene, lower alkanoyloxyalkylene, or lower chloroalkylene; and
R$_4$ = phenylcarbamoyloxy, lower alkylcarbamoyloxy, chlorine, bromine, mercapto, lower alkylthio, lower alkanoyl, lower alkanoyloxy, hydroxyl, amino, lower alkanoylamino, or carbamoyl.

3. An azo compound designated in claim 2 wherein R$_4$ is hydroxy, lower alkanoyloxy, phenylcarbamoyloxy, or lower alkylcarbamoyloxy.

4. The compound

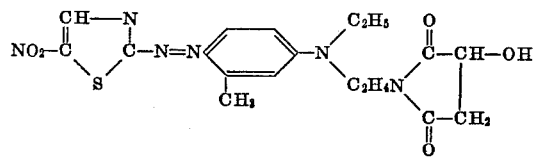

5. The compound

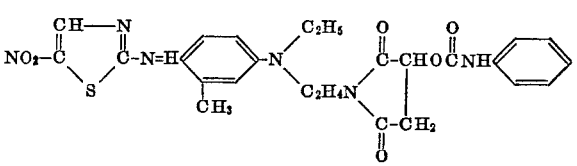

6. The compound
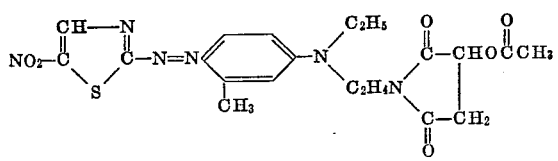
7. The compound
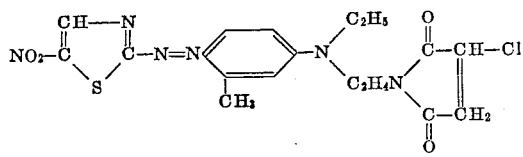
8. The compound
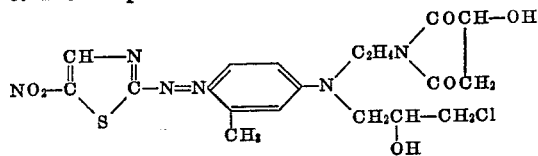
References Cited
UNITED STATES PATENTS
3,161,631  12/1964  Straley et al. ———— 260—158
CHARLES B. PARKER, *Primary Examiner.*
DONALD M. PAPUGA, *Assistant Examiner.*
U.S. Cl. X.R.
260—326.5, 326.3, 281, 37; 8—41, 55